United States Patent
Amano

Patent Number: 5,459,391
Date of Patent: Oct. 17, 1995

[54] BATTERY CHARGER WITH TEMPERATURE DETECTOR

[75] Inventor: Katsutoshi Amano, Kanagawa, Japan

[73] Assignee: Sony Corporation, Tokyo, Japan

[21] Appl. No.: 989,882

[22] Filed: Dec. 11, 1992

Related U.S. Application Data

[63] Continuation of Ser. No. 742,348, Aug. 8, 1991, abandoned.

[30] Foreign Application Priority Data

Aug. 28, 1990 [JP] Japan ................................. 2-225753

[51] Int. Cl.⁶ ................................................. H02J 7/04
[52] U.S. Cl. ................................. 320/35; 320/21
[58] Field of Search .................... 320/20, 21, 22, 320/23, 35

[56] References Cited

U.S. PATENT DOCUMENTS

| | | | |
|---|---|---|---|
| 3,938,021 | 2/1976 | Kosmin | 320/40 |
| 4,061,956 | 12/1977 | Brown et al. | 320/22 |
| 4,371,827 | 2/1983 | Mullersman et al. | 320/48 |
| 4,388,583 | 6/1983 | Krueger | 320/46 |
| 4,424,437 | 1/1984 | Walter et al. | 219/364 |
| 4,513,238 | 4/1985 | Orban | 320/23 |
| 4,649,333 | 3/1987 | Moore | 320/31 |
| 4,775,827 | 10/1988 | Ijintema et al. | 320/44 |
| 4,806,840 | 2/1989 | Alexander et al. | 320/20 |
| 4,829,226 | 5/1989 | Nakamura et al. | 320/35 |
| 4,833,390 | 5/1989 | Kumada et al. | 320/2 |

FOREIGN PATENT DOCUMENTS

| | | |
|---|---|---|
| 0147241 | 3/1985 | European Pat. Off. . |
| 3044659 | 6/1982 | Germany . |
| 3728645 | 3/1989 | Germany . |
| 57-021077 | 2/1982 | Japan . |

Primary Examiner—Kristine L. Kincaid
Assistant Examiner—Adolf Berhane
Attorney, Agent, or Firm—Ronald P. Kananen

[57] ABSTRACT

A battery charger for charging a secondary battery has an infrared radiation sensor for detecting the surface temperature of the secondary battery while the secondary battery is being charged. A charging control circuit stops charging the secondary battery, typically an Ni-MH battery, when the surface temperature detected by the infrared radiation sensor has reached a predetermined temperature. The battery charger also has a potential detector for detecting an electric potential of the secondary battery. The charging control circuit stops charging the secondary battery, typically an Ni—Cd battery, when the electric potential detected by the potential detector starts dropping after the battery has fully been charged.

3 Claims, 2 Drawing Sheets

BATTERY CHARGER WITH TEMPERATURE DETECTOR

This application is a continuation of application Ser. No. 07/742,348, filed Aug. 8, 1991, now abandoned.

BACKGROUND OF THE INVENTION

1. Field of the Invention

The present invention relates to a battery charger for charging a secondary battery for energizing an electronic device such as a video camera, and more particularly to a battery charger suitable for charging a nickel-hydrogen-occluded-alloy battery (hereinafter referred to as an "Ni-MH battery").

2. Description of the Prior Art

Nickel-cadmium (Ni—Cd) batteries are widely used as secondary batteries for energizing relatively small electronic devices such as video cameras. While an Ni—Cd battery is being charged, the electric potential between the positive and negative electrodes of the battery is detected. When the detected potential is increasing, the battery is continuously charged because it is normally charged. When the detected potential starts dropping, the battery charging process is brought to an end as it has fully been charged.

Other secondary batteries which are more efficient than the Ni—Cd battery are under development in recent years. One of the new secondary batteries is an Ni-MH battery. The Ni-MH battery produces a large amount of heat while it is being charged. If the Ni-MH battery is charged until the potential between positive and negative electrodes thereof begins dropping, it is so heated that it could not be held by hand, and hence is very dangerous when manually handled. To avoid this drawback, it has been customary to use a temperature detector such as a thermistor on the Ni-MH battery for detecting the temperature of the Ni-MH battery. The Ni-MH battery has output terminals for producing detected temperature information indicative of the temperature detected by the temperature detector, as well as terminals connected to the positive and negative electrodes through which the battery can be charged and discharged. While the Ni-MH battery is being charged by a battery charger, the detected temperature information produced by the output terminals is monitored. When the detected temperature of the battery exceeds a predetermined temperature, it is necessary to stop charging the battery.

However, the Ni-MH battery of the above structure is complex and costly because of the temperature detector and its output terminals that are additionally included in the battery. The battery charger used to charge the Ni-MH battery is not compatible with Ni—Cd batteries now in use since the battery charger has additional terminals for reading the detected temperature information from the Ni-MH battery.

OBJECTS AND SUMMARY OF THE INVENTION

It is an object of the present invention to provide a battery charger of simple arrangement which can easily charge secondary batteries such as Ni-MH batteries that produce intensive heat while being charged.

According to the present invention, there is provided a battery charger for charging a secondary battery connected thereto, comprising temperature detecting means for detecting a surface temperature of a secondary battery while the secondary battery is being charged, and control means for stopping charging the secondary battery when the surface temperature detected by the temperature detecting means has reached a predetermined temperature.

The secondary battery to be charged by the battery charger is not required to have a temperature detector such as a thermistor. The secondary battery and the battery charter are also not required to have terminals for transmitting temperature information from the secondary battery to the battery charger. Therefore, the secondary battery and the battery charger may be relatively simple in structure.

The above and other objects, features, and advantages of the present invention will become apparent from the following description of an illustrative embodiment thereof to be read in conjunction with the accompanying drawings, in which like reference numerals represent the same or similar objects.

DETAILED DESCRIPTION OF THE PREFERRED EMBODIMENT

Figure 1:
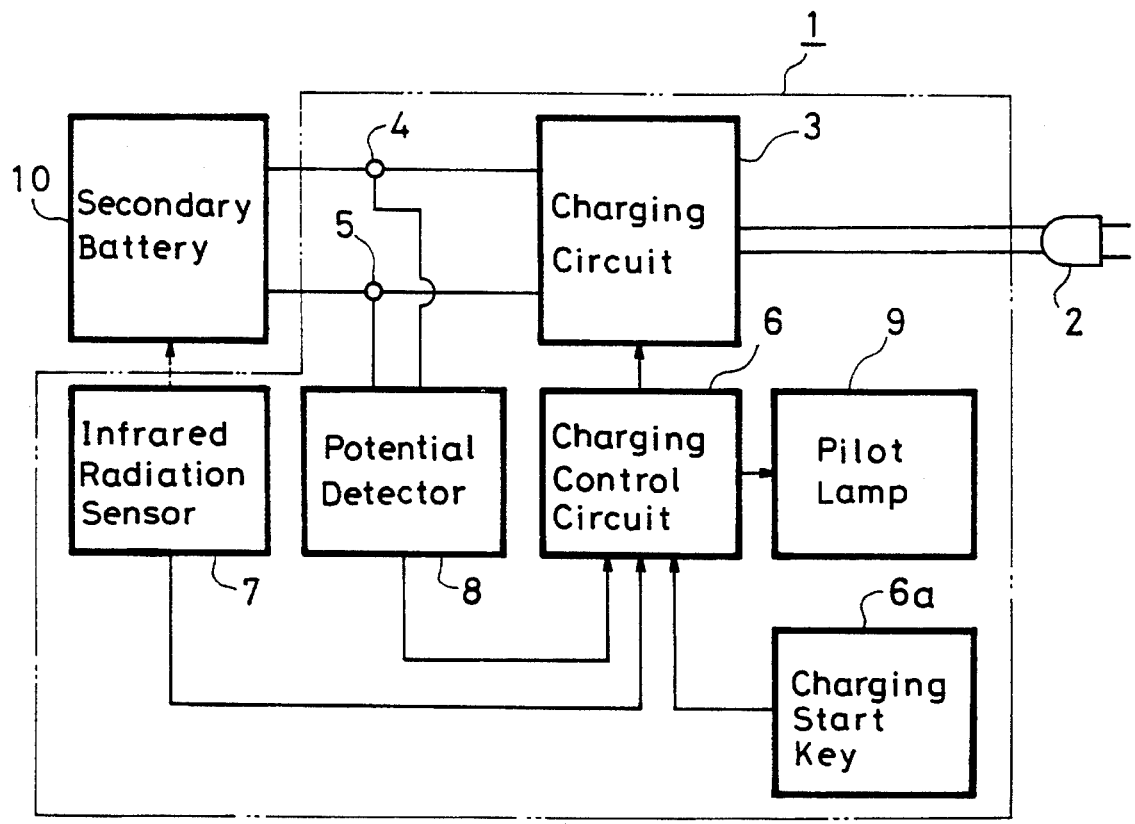
FIG. 1 is a block diagram of a battery charger according to the present invention.
Figure 2:
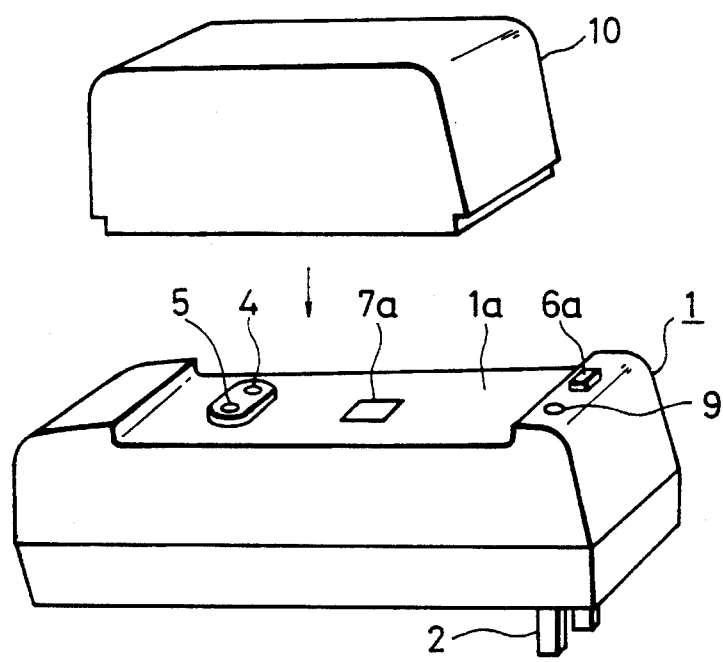
FIG. 2 is a perspective view of the battery charger.

FIGS. 1 and 2 show a battery charger according to the present invention. The battery charger, generally designated by the reference numeral 1, has a charging circuit 3 supplied with commercial AC electric power from a plug 2 connected to a commercial power outlet. The charging circuit 3 converts the voltage of the commercial AC electric power and rectifies the commercial AC electric power so that it generates a charging direct current at a low voltage.

A secondary battery 10 such as an Ni-MH battery is connected to the battery charger 1. Specifically, charging/discharging terminals connected to the positive and negative electrodes of the secondary battery 10 are connected respectively to charging terminals 4, 5 of the battery charger 1, the charging terminals 4, 5 being connected to the charging circuit 3. The charging current produced by the charging circuit 3 is supplied through the charging terminals 4, 5 to the secondary battery 10, thereby charging the secondary battery 10. The charging current produced by the charging circuit 3 is controlled by a charging control circuit 6. When a charging start key 6a connected to the charging control circuit 6 is pressed, the charging control circuit 6 controls the charging circuit 3 to supply the charging current to the secondary battery 10 to start charging the secondary battery 10. Based on information supplied from an infrared radiation sensor 7 and a potential detector 8 to the charging control circuit 6, the charging control circuit 6 controls the charging circuit 3 to stop charging the secondary battery 10, i.e., to stop supplying the charging current to the secondary battery 10.

Figure 3:
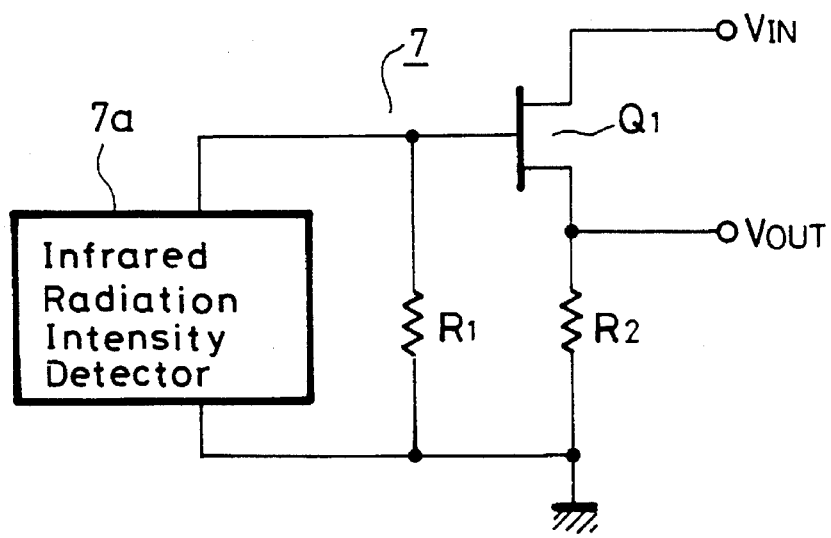
FIG. 3 is a circuit diagram of an infrared sensor of the battery charger.

As shown in FIG. 2, the infrared radiation sensor 7 has an infrared radiation intensity detector 7a exposed at a substantially central area of a joint surface 1a of the battery charger 1 for contact with the secondary battery 10. As shown in FIG. 3, the infrared radiation intensity detector 7a is electrically connected to an amplifier comprising a field-effect transistor. More specifically, the infrared radiation intensity detector 7a has opposite terminals connected across a resistor R1, one of the opposite terminals being also connected to the gate of a field-effect transistor Q1 and the other terminal to ground. A power supply voltage input terminal VIN for applying a power supply voltage Vcc is connected to the drain of the field-effect transistor Q1, the source of which is grounded through a resistor R2. The source of the field-effect transistor Q1 is also joined to an infrared radiation intensity output terminal VOUT. The electric potential applied from the field-effect transistor Q1 is monitored by the charging control circuit 6.

When the secondary battery 10 mounted on the battery charger 1 for being charged thereby, the surface of a substantially central mating area of the secondary battery 10 is held against the infrared radiation intensity detector. While the secondary battery 10 is being charged by the battery charger 1, the infrared radiation sensor 7 detects an intensity of infrared radiation which is proportional to the surface temperature of the secondary battery 10.

When the detected intensity of infrared radiation reaches or exceeds a predetermined level corresponding to 50° C. during charging of the secondary battery 10, the charging control circuit 6 controls the charging circuit 3 to stop supplying the charging current therefrom, thereby stopping charging the secondary battery 10.

The potential detector 8 detects an electric potential between the charging terminals 4, 5 of the battery charger 1. The potential information detected by the potential detector 8 is supplied to the charging control circuit 6, which monitors the electric potential of the secondary battery 10. When the electric potential of the secondary battery 10 being charged starts dropping, the charging control circuit 6 decides that the secondary battery 10 has been fully charged, and therefore controls the charging circuit 3 to stop supplying the charging current therefrom, thereby stopping charging the secondary battery 10.

While the secondary battery 10 is being charged with the charging current supplied from the charging circuit 3, a pilot lamp 9 connected to the charging control circuit 6 is energized by the charging control circuit 6.

Figure 4:
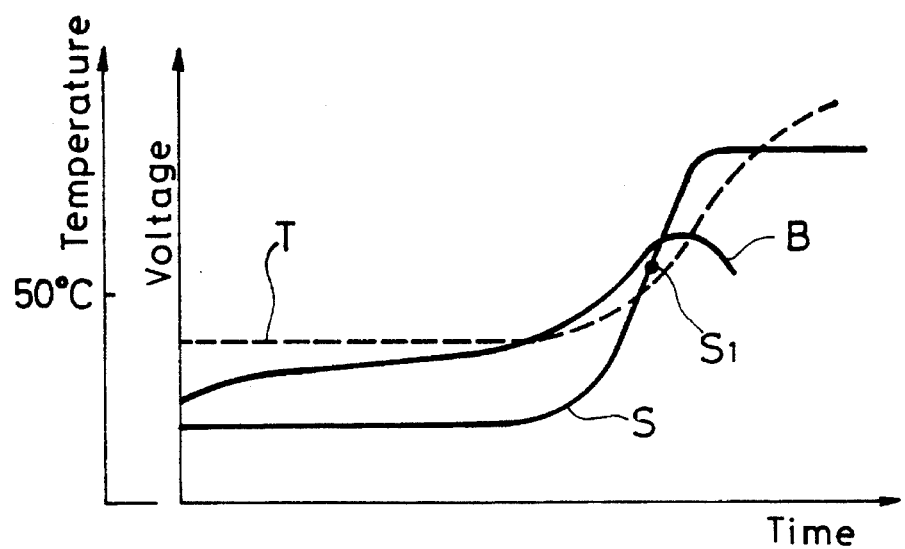
FIG. 4 is a diagram showing characteristics of the battery charger.

Operation of the battery charger 1 to charge the secondary battery 10 will be described below with reference to FIG. 4.

First, the plug 2 of the battery charger 1 is inserted into a commercial power outlet (not shown), and the secondary battery 10 to be charged is mounted on the joint surface 1a, with the positive and negative electrode terminals of the secondary battery 10 being connected respectively to the charging terminals 4, 5 of the battery charger 10. It is assumed that the secondary battery 10 is in the form of an Ni-MH battery and hence FIG. 4 shows charging characteristics of such an Ni-MH battery. Now, the charging start key 6a is pressed to start charging the Ni-MH battery 10. When the Ni-MH battery 10 starts being charged, the surface temperature of the Ni-MH battery 10 also starts rising gradually. More specifically, as shown in FIG. 4, after the Ni-MH battery 10 has begun being charged, the potential or voltage B thereof which is detected by the potential detector 8 progressively increases. When the Ni-MH battery approaches a nearly fully charged condition, the temperature inside the Ni-MH battery 10 increases. Therefore, the surface temperature T of the Ni-MH battery 10 also rises with the inside temperature, and the output voltage S of the infrared sensor 7, which corresponds to the surface temperature T of the Ni-MH battery 10, also rises.

When the Ni-MH battery 10 is fully charged, the battery voltage B starts dropping. When the Ni-MH battery 10 is fully charged in a continuous charging process, the surface temperature T thereof increases in excess of 50° C.

According to the battery charger 1 of the present invention, when the surface temperature T of the Ni-MH battery 10 reaches 50° C., the charging control circuit 6 stops charging the Ni-MH battery 10 based on the infrared radiation intensity which is detected by the infrared radiation sensor 7. Therefore, immediately before the Ni-MH battery 10 is fully charged, the surface temperature T reaches 50° C., and the Ni-MH battery 10 stops being charged at the time the output voltage S of the infrared radiation sensor 7 exceeds a level S1 that corresponds to the temperature of 50° C. Accordingly, the surface temperature T of the Ni-MH battery 10 is prevented from increasing in excess of 50° C. while it is being charged, and the battery charger 1 is protected from thermally induced damage.

If the secondary battery 10 comprises an Ni—Cd battery, it does not emit as much heat as the Ni-MH battery while being charged. Therefore, the Ni—Cd battery 10 is fully charged before the output voltage S of the infrared radiation sensor 7 exceeds the level S1 corresponding to the temperature of 50° C. The Ni—Cd battery 10 stops being charged based on a drop of the battery voltage B as detected by the potential detector 8. Unless some malfunctioning occurs, the Ni—Cd battery 10 does not stop being charged on the basis of the output voltage S of the infrared radiation sensor 7.

With the above arrangement of the battery charger 1, when a secondary battery which produces intensive heat, such as an Ni-MH battery, is charged, the surface temperature of the battery is detected by the infrared radiation sensor 7, and the battery stops being charged when the detected surface temperature has increased to a certain level. When a secondary battery which produces less intensive heat, such as an Ni—Cd battery, is charged, the voltage of the battery is detected by the potential detector 8, and the battery stops being charged when the detected battery voltage has dropped to a certain level. At any rate, the batteries of different types can well be charged by the same battery charger 1.

Since the temperature of a secondary battery which produces intensive heat, such as an Ni-MH battery, is indirectly detected by the infrared radiation sensor 7, it is not necessary to include a temperature detector, such as a thermistor, in the battery, and any terminals for supplying temperature information from the battery to the battery charger are not required. Therefore, both the battery and the battery charger are relatively simple in structure. With the number of terminals on a secondary battery which produces intensive heat, such as an Ni-MH battery, being the same as the number of terminals on other conventional secondary batteries such as an Ni—Cd battery, the Ni-MH battery may be of a shape identical to that of the Ni—Cd battery. Consequently, newly developed, more efficient secondary batteries such as an Ni-MH battery may be used on various electronic devices such as video cameras which are designed for use with the Ni—Cd battery.

While the surface temperature of the secondary battery 10 is detected by the infrared radiation sensor 7 in the illustrated embodiment, the surface temperature may be detected by any of various other temperature sensors. The battery charger 1 has been described as being used to charge Ni-MH and Ni—Cd batteries. However, the battery charger 1 may be used to charge other secondary batteries. The battery charger 10 may stop charging a secondary battery at a temperature other than 50° C., depending on the characteristics of the battery to be charged by the battery charter 10.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A battery charger, comprising:

a charging circuit, having positive and negative charging terminals for connection to corresponding terminals of a secondary battery, for charging said secondary battery by current supplied through the charging terminals to the secondary battery;

a charging control circuit connected to said charging circuit for controlling the charging current provided by said charging circuit through said charging terminals to said secondary battery; and an infrared radiation sensor located in said battery charger at a location for sensing a surface temperature of said secondary battery when said secondary battery is located on said battery charger for charging, said infrared radiation sensor being located in said battery charger to remain in said battery charger when said secondary battery is connected and unconnected from said battery charger, said infrared radiation sensor being electrically connected with said charging control circuit through a terminal other than the charging terminals, and said infrared radiation sensor providing a signal indicative of the surface temperature of said secondary battery; and said charging control circuit stopping charging of said secondary battery when the detected surface temperature of said secondary battery exceeds a predetermined maximum temperature;

wherein said secondary battery is in the form of an Ni-MH battery exhibiting a surface temperature characteristic which increases during charging and a potential characteristic which increases during charging, whereas when the battery is charged, the battery voltage starts dropping and its surface temperature increases in excess of about 50° C.

2. The battery charger as set forth in claim 1, wherein said infrared radiation sensor is free from contact with the surface of said secondary battery except when said battery is engaged with said battery charger for charging.

3. The battery charger as set forth in claim 1, further comprising potential detecting means for detecting an electric potential of the secondary battery, said control means further comprising means for stopping the charging of the secondary battery as a function of the electric potential detected by said potential detecting means independent of said detected surface temperature of said secondary battery.

* * * * *